United States Patent [19]

Priestley

[11] 4,427,550

[45] Jan. 24, 1984

[54] REGENERATION OF ADSORBENTS

[75] Inventor: Anthony J. Priestley, Elsternwick, Australia

[73] Assignee: Commonwealth Scientific and Industrial Research Organization, Campbell, Australia

[21] Appl. No.: 363,930

[22] Filed: Mar. 31, 1982

[51] Int. Cl.³ .............................................. B01J 20/34
[52] U.S. Cl. .................................. 210/675; 210/677; 210/189; 210/194; 210/269
[58] Field of Search ........................ 210/670, 675–678, 210/189, 269, 194, 196, 198.1, 199, 209, 215, 222, 223, 252, 259; 252/411 R, 412, 420; 521/26

[56] References Cited

FOREIGN PATENT DOCUMENTS 512553 10/1980 Australia .

Primary Examiner—Ivars C. Cintins
Attorney, Agent, or Firm—Cushman, Darby & Cushman

[57] ABSTRACT

A process for the regeneration and recovery of a loaded adsorbent which comprises the steps of:
(a) contacting the loaded adsorbent with an alkaline solution for a period sufficient to effect regeneration of the adsorbent;
diluting the resulting slurry of the adsorbent in the alkaline solution with recycled overflow liquid from one or both of the subsequent separation steps, to thereby reduce the concentration of adsorbent in the slurry to at least the level where unhindered settling can occur;
(c) separating the slurry to give a first liquid overflow and a first solids underflow containing the adsorbent and discharging at least a portion of the first liquid overflow to waste, the remainder (if any) being returned to step (b);
(d) slurrying the first solids underflow from step (c) with washwater and recycled second liquid overflow from the subsequent separation step;
(e) separating the thus formed slurry to give a second liquid overflow and a second solids underflow containing the adsorbent and returning a portion of the second liquid overflow to step (d) and the balance to step (b);
(f) recovering the second solids underflow containing the regenerated and washed adsorbent.

15 Claims, 1 Drawing Figure

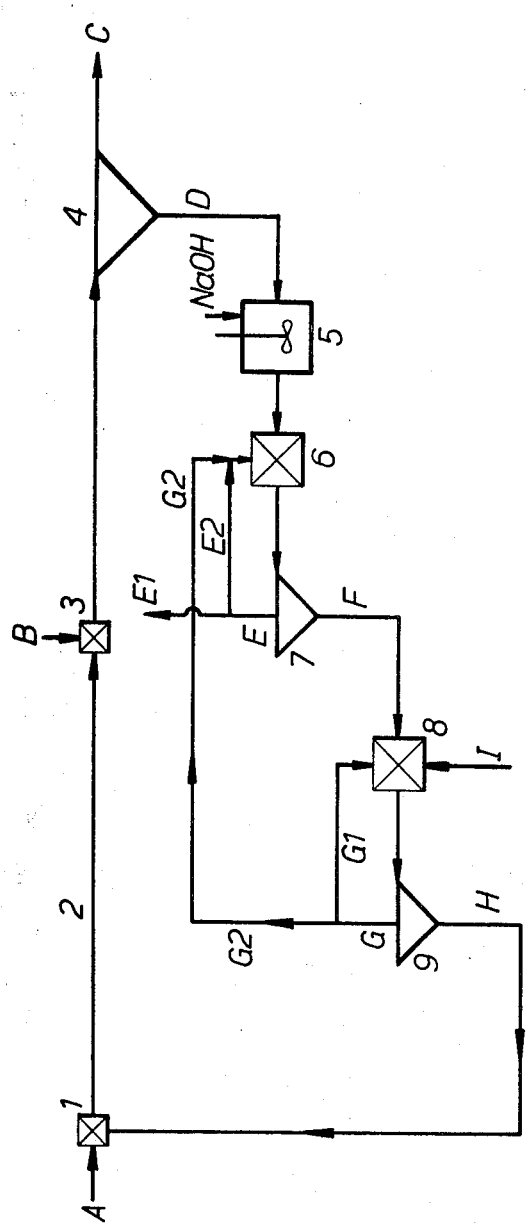

REGENERATION OF ADSORBENTS

This invention is concerned with a method for regenerating adsorbents, in particular the so-called "coagulant/adsorbents" used in the water clarification process described in our Australian Patent No. 512,553 and patent application No. 40032/78.

The patent describes how suspended impurities and coloured substances can be removed from water by contact with a "coagulant/adsorbent," that is a finely divided particulate mineral material, the individual particles of which have a thin hydroxylated surface layer which has a positive zeta potential at the adsorption pH, i.e., the pH of the water under treatment. The patent application shows that the operation of this process is improved by the addition of a polyelectrolyte during the treatment.

Coagulant/adsorbent which has become loaded with impurities and coloured substances during water treatment is regenerated by a simple treatment with aqueous alkali. This releases from the surface of the coagulant/adsorbent the impurities and coloured substances which pass into the alkali solution and can thus be separated from the coagulant/adsorbent. After washing the coagulant/adsorbent can be recycled for use in the water treatment process.

Because the coagulant/adsorbent must be in the form of very fine particles (less than 10 microns) the most preferred mineral materials for the coagulant/adsorbent are magnetic or magnetisable materials, in particular magnetite because of the relative ease with which such materials can be handled, i.e., by magnetic means, compared to non-magnetic particles of similar size.

The commercial viability of the water clarification process described in our patent depends largely on the successful regeneration and reuse of the magnetite used as the preferred coagulant/adsorbent. The patent describes a process involving a three-stage, countercurrent-flow, alkali regeneration which makes use of magnetic separators and has been successfully applied in process trials. Further development of the process to the commercial plant scale, however, has delineated several disadvantages of the existing recovery process. Firstly, it is relatively expensive for small scale applications; the regeneration train can represent about half of the total capital cost of the plant. Because of this fact the existing clarification process is uneconomic for plants with a capacity less than 10 Ml/day. Also, the process produces a liquid effluent with a volume of not less than 5% of the total plant throughput, compared with $\frac{1}{2}$% to 1% of plant throughput for the effluent volume from a conventional alum flocculation process. This difference can result in additional costs for effluent disposal in the process of the patent.

The present invention has as its main objective, the provision of an improved recovery and regeneration procedure for the aforesaid coagulant/adsorbents, especially magnetite, which avoids the problems just referred to.

During our investigations of alternative magnetite regeneration processes, we attempted to replace the magnetic separators used in our patented process with simple settling tanks but this gave unsuccessful results. At the water to magnetite ratios which we had used with magnetic separators in the regeneration stages of our patented process (18% to 25% w/w magnetite) we found although settling occurred, much of the turbidity and colour released from the surface of the magnetite following alkali treatment remained trapped in the settled solids bed rather than appearing in the supernatant liquid. This reduced the overall efficiency of the regeneration and washing stages and consequently the capacity of the regenerated magnetite to effect clarification of water when recycled in accordance with the patented process.

We attribute this behaviour to the phenomenon we have termed "hindered settling," wherein the boundary layers surrounding adjacent particles interact and modify the velocity gradients in the vicinity of the particle surface. Thus, adjacent particles indirectly modify the forces acting on each other, and the settling velocity is greatly reduced from that of a single particle. The settling velocity of a particle no longer depends on its particle size, but only on the concentration of other particles in its immediate vicinity.

Because of the relatively high concentration of solids in the slurry phase and the steep velocity gradient in the boundary layer surrounding each particle, colloidal particles in the interstitial liquid are much more likely to impinge on a particle surface. Consequently, the smaller particles of colloidal material become trapped in the interstices between the larger magnetite particles and are carried down with them, with the result that all the solids settle in the form of a blanket with a sharp interface between the slurry and the clear liquid phase. This is the prime reason for the apparent unsuitability of settling tanks in the present regeneration process.

We have now found that the above problems can be overcome by reducing the slurry concentration to a level where individual particles do not interact and discrete unhindered settling can take place. For the magnetite-water system we have found this occurs below a slurry concentration of about 10% w/w magnetite and that by operating at slurry concentrations of this level it is possible to employ settling tanks in place of the magnetic separators of our patented process.

However, using settling tanks and such a dilute slurry but retaining the flow scheme described in our patent, would require a very significant increase in the washwater consumption and consequently in the volume of effluent water for disposal.

We have found that by suitable redesign of the regeneration and washing stages of the flowscheme we can not only avoid increasing washwater consumption, but we can actually reduce it, and the effluent for disposal, to levels comparable with those obtainable in a conventional alum-flocculation process. This new flowscheme forms the basis for the present invention.

According to one aspect of the present invention, there is provided a process for the regeneration and recovery of a loaded adsorbent (as hereinafter described) which comprises the steps of:

(a) contacting the loaded adsorbent with an alkaline solution for a period sufficient to effect regeneration of the adsorbent;

(b) diluting the resulting slurry of the adsorbent in the alkaline solution with recycled overflow liquid from one or both of the subsequent separation steps, to thereby reduce the concentration of adsorbent in the slurry to at least the level where unhindered settling can occur;

(c) separating the slurry to give a first liquid overflow and a first solids underflow containing the adsorbent and returning a portion of the first liquid overflow to step (b), the remainder being discharged to waste;

(d) slurrying the first solids underflow from step (c) with washwater and recycled second liquid overflow from the subsequent separation step;

(e) separating the thus formed slurry to give a second liquid overflow and a second solids underflow containing the adsorbent and returning a portion of the second liquid overflow to step (d) and the balance to step (b);

(f) recovering the second solids underflow containing the regenerated and washed adsorbent.

It is preferred that the separations in steps (c) and (e) are carried out in settling tanks, but the advantages of the process can be realized with other separating apparatus, such as magnetic separators.

The term "adsorbent" is used herein for convenience to refer to finely-divided particulate magnetite or any other suitable adsorbent used as a coagulant/adsorbent in the process of our patent or patent application. "Loaded" implies the coagulant/adsorbent has been used in the water-clarification process.

It will be evident to those skilled in the art that the regeneration and recovery process of the invention may also have other applications, i.e., those associated with water-clarification by methods other than those described in our patent and patent application.

The preferred time for regeneration step (a) is about 10 minutes.

As already indicated the preferred adsorbent is magnetite for which, in step (b) of the process the concentration after dilution should be less than about 10% w/w.

The invention also includes a process for water clarification which includes the regeneration and recovery process defined above but is otherwise in accordance with the teachings of our patent or patent application.

The process of the present invention will be further described and elucidated in the following discussion, in which reference is made to the accompanying drawing which is a flowscheme of a water clarification process including the regeneration process of the invention.

As shown in the flowscheme, raw water (A) and regenerated coagulant/adsorbent (magnetite) are admixed at 1 and fed to a contactor 2 which may be a pipe as described in our aforementioned Patent No. 512,553, or any other suitable apparatus. If desired the polyelectrolyte (B) may be added to the mixture (in accordance with our patent application No. 40032/78) as it leaves the contactor 2. The mixture then passes to a solids clarifier 4 which may be of any suitable type, for example, those described in our patent. Clarified water (C) is taken off as the overflow from the clarifier 4.

The solids underflow (D) from the clarifier 4 consists of a loaded coagulant/adsorbent, i.e., associated with the colloidal and other impurities which have been removed from the water. This underflow passes to the regeneration mixing stage 5 where it is mixed with dilute caustic soda to raise the pH to a level sufficient to free the coagulant/adsorbent from the impurities (e.g., about pH 10 to 11) and thence to another mixer 6 where it is mixed with overflow liquid from one or both of the subsequent separator stages (lines E2 and G2) to reduce the solids content to a suitable level, less than 10% w/w in the case of magnetite. The mixture is then passed to a first settling tank 7. The overflow stream (E) from the tank 7 is split into two streams (E1 and E2), the first of which passes to waste and the second to the mixer 6.

The underflow stream (F) containing the coagulant/adsorbent passes to a second mixer 8 where it is mixed with washwater (I) and overflow liquid from the subsequent separator stage (line G1). The mixture passes from mixer 8 to the second settling tank 9.

The liquid overflow (G) from tank 9 is split into two streams (G1) and (G2). Stream (G1) is returned to the second mixer 8 and stream (G2) to the first mixer 6.

The underflow stream (H) containing the regenerated washed magnetite is recycled for admixture at 1 with raw water.

It will be obvious that process conditions can be adjusted by varying the ratio between streams (G1) and (G2) and (E1) and (E2). Such adjustments may include the complete elimination of some of the streams (G1) (G2) or (E2).

It will be noted that in the present flowscheme the loaded magnetite from the clarifier (4) is regenerated in a single stage treatment with alkali (caustic soda). This differs from the flowscheme of our patented process which employs a three-stage alkali regeneration.

As in our previous process, there are two washing stages after regeneration, but these have been altered as regards the provision of washwater recycle loops. By this revision of the washwater recycle arrangements, the solids concentration in the solid/liquid separation steps can be reduced to the point where discrete unhindered settling of the solid phase can occur without resulting in an increase in the total washwater requirement. In fact, it has been found possible to reduce the washwater consumption to surprisingly low levels (about 1% of plant throughput) with this new flowscheme.

The process of the invention provides significant advantages over our earlier process, namely:

1. Magnetic separators can be replaced with settling tanks. For small scale plants (<10 Ml/day) this allows the use of simple cheap hopper bottom type clarifiers.
2. The washwater makeup can be reduced to around 1% or less of plant throughput. This not only reduces operating costs but also greatly reduces the effluent disposal problems.
3. The total number of steps for regeneration and washing has been reduced from 5 to 3.

Those skilled in the art will appreciate that a further washing step or steps may be added to the above-described process, if this should be considered necessary.

In Jar Test studies of the kind described in our patent and patent application, we investigated the performance of a magnetite coagulant/adsorbent over many cycles of water treatment, using Yarra River (Vic.) water, and regeneration, using mixing and settling procedures which simulated the process of the present invention. After 37 cycles the magnetite was still performing adequately as a coagulant/adsorbent and its performance was approaching a steady state, i.e., its performance before and after a regeneration stage was substantially unchanged. This indicates that the treatment/regeneration cycle could be repeated almost indefinitely.

The invention is further illustrated by the following Examples.

Examples 1 to 3 relate to a series of pilot plant experiments performed to study the regeneration and recovery of a magnetite coagulant/adsorbent which had been used at the rate of 12.5 g/l to clarify Yarra River (Vic) water having a turbidity of 60 NTU and a colour of 43

Pt-Co units. When fresh magnetite was used to clarify this water in accordance with the teachings of our patent and patent application, the clarified water had a turbidity of 0.5 NTU and a colour of 4 Pt-Co units.

EXAMPLE 1

The loaded magnetite was regenerated as described in our patent except that settling tanks were used in place of magnetic separators. The concentration of magnetite in the washing stages was 30% w/w and the wash water bleed rate was 3% i.e., the volume of water used to wash the regenerated magnetite was 3% of the total product water volume from the clarification stage.

The regenerated and washed magnetite was then used to treat a further quantity of the river water, after which the magnetite was again regenerated. After two such cycles it was found that the turbidity of the clarified water had risen to 14 NTU and its colour to 9 Pt-Co units, i.e., the regenerated magnetite was substantially inferior to fresh magnetite in effecting clarification.

EXAMPLE 2

The procedure of Example 1 was repeated except that regeneration and recovery of the magnetite was carried out in accordance with the method of the present invention, the concentration of the magnetite in the washing stages being 8% w/w. After 35 cycles the clarified water had a turbidity of 0.5 NTU and a colour of 4 Pt-Co units, showing that the performance of the regenerated magnetite was equal to that of fresh magnetite.

EXAMPLE 3

The procedure of Example 2 was repeated except that the wash water bleed rate was reduced to 1%. After 35 cycles the clarified water had a turbidity of 0.8 NTU and a colour of 8 Pt-Co units, showing that a substantial reduction in the wash water bleed rate had only a minor effect on the quality of the product water.

EXAMPLE 4

The effect of varying the wash water feed rate on the quality of the clarified water was further examined in a pilot water clarification plant in which regeneration of the loaded adsorbent (magnetite) was performed as described in our patent and magnetic drum separators were used to carry out the separation stages during regeneration and washing of the magnetite. The concentration of the magnetite in the washing stages was 30% w/w. It was found that when the wash water bleed rate was reduced from 5% to 1% the turbidity of the product water rose from 1.0 NTU to 3.3 NTU.

EXAMPLE 5

The procedure of Example 4 was repeated in another water clarification plant using magnetic drum separators but in which the regeneration and washing stages were constructed and operated in accordance with the teachings of the present invention. The concentration of the magnetite in the washing stages was 8% w/w. When the wash water bleed rate was reduced from 5% to 1% the turbidity of the product water rose from 0.9 NTU to only 1.3 NTU.

This example when taken in conjunction with Example 4 demonstrates the greater efficiency of the regeneration and washing procedure of the present invention compared with the procedure disclosed in our patent even when magnetic separators are used. It also shows that the present invention allows a reduction in the wash water bleed rate to about 1% without significant decrease in the quality of the clarified water.

I claim:

1. A process for the regeneration and recovery of a loaded adsorbent which comprises the steps of:
   (a) contacting the loaded adsorbent with an alkaline solution for a period sufficient to effect regeneration of the adsorbent;
   (b) diluting the resulting slurry of the adsorbent in the alkaline solution with recycled overflow liquid from one or both of the subsequent separation steps, to thereby reduce the concentration of adsorbent in the slurry to at least the level where unhindered settling can occur;
   (c) separating the slurry to give a first liquid overflow and a first solids underflow containing the adsorbent and discharging at least a portion of the first liquid overflow to waste, the remainder being returned to step (b);
   (d) slurrying the first solids underflow from step (c) with washwater and recycled second liquid overflow from the subsequent separation step;
   (e) separating the thus formed slurry to give a second liquid overflow and a second solids underflow containing the adsorbent and returning a portion of the second liquid overflow to step (d) and the balance to step (b);
   (f) recovering the second solids underflow containing the regenerated and washed adsorbent.

2. A process as claimed in claim 1, wherein the time for the regeneration step (a) is about 10 minutes.

3. A process as claimed in claim 1 or claim 2, wherein the adsorbent is magnetite.

4. A process as claimed in claim 3, wherein the concentration of the magnetite slurry after dilution in step (b) is less than about 10% by weight.

5. A process for the clarification of water wherein the water is contacted with a coagulant/adsorbent consisting of a finely divided particulate mineral material the individual particles of which have a thin hydroxylated surface layer which has a positive zeta potential at the adsorption pH and the water is separated from the coagulant/adsorbent to obtain the clarified water, characterized in that the coagulant/adsorbent is regenerated by the process of claim 1.

6. A process as claimed in claim 1, wherein at least one of the separations in steps (c) and (e) is carried out in a settling tank.

7. A process as claimed in claim 1, wherein at least one of the separations in steps (c) and (e) is carried out in a magnetic separator.

8. A process as claimed in claim 1, wherein the wash water bleed rate is less than 5%.

9. A process as claimed in claim 8, wherein the wash water bleed rate is about 1%.

10. Apparatus the regeneration and recovery of a loaded adsorbent used in water clarification comprising
   (a) first mixing means for slurrying the loaded adsorbent with an alkaline solution to effect regeneration of the adsorbent;
   (b) second mixing means for mixing the slurry from step (a) with overflow liquid from one or both subsequent separation stages to reduce the solids content of the slurry;
   (c) first separating means for separating the slurry from (b) to give a first solids underflow and a first liquid overflow;

(d) means for returning a portion of the first liquid overflow to the second mixing means (b) and discharging the remaining liquid to waste;
(e) third mixing means for slurrying the first solids underflow with washwater and overflow liquid from the subsequent stage;
(f) second separating means for separating the slurry from (e) to give a second solids underflow containing the regenerated washed adsorbent, and a second liquid overflow;
(g) means for returning a portion of the second liquid overflow to the second mixing means (b) and the remaining liquid overflow to the third mixing means (e).

11. Apparatus according to claim 10 further comprising
(aa) a means to introduce the regenerated adsorbent to a mixing and contacting means for contacting the water to be treated with a coagulant/adsorbent;
(bb) means for introducing a polyelectrolyte into the mixture of water and coagulant adsorbent; and
(cc) primary separating means for separating the treated water from the loaded coagulant/adsorbent.

12. Apparatus as claimed in claim 10 or claim 11, wherein the means (d) and (g) include regulating means for adjusting the proportions of the liquid overflows returned to the respective stages.

13. An apparatus for the clarification of water according to claim 11 wherein the water is contacted with a polyelectrolyte and a coagulant/adsorbent consisting of a finely divided particulate mineral material the individual particles of which have a thin hydroxylated surface layer which has a positive zeta potential at the adsorption pH and the water is separated from the coagulant/adsorbent to obtain the clarified water.

14. Apparatus as claimed in claim 10, wherein the separating means (c) and/or (f) comprise a settling tank.

15. Apparatus as claimed in claim 10, wherein the separating means (c) and/or (f) comprise a magnetic separator.

* * * * *